(12) United States Patent
Baroni et al.

(10) Patent No.: US 10,592,707 B2
(45) Date of Patent: *Mar. 17, 2020

(54) DYNAMIC MANAGEMENT OF RELATIVE TIME REFERENCES IN DOCUMENTS

(71) Applicant: International Business Machines Corporation, Armonk, NY (US)

(72) Inventors: Alessandro Baroni, L'Aquila (IT); Emanuela Fionchetti, Rome (IT); Alessandro Ghezzi, Rome (IT); Antonio M. Sgro, Rome (IT); Marta Usai, Villacidro (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/133,112

(22) Filed: Sep. 17, 2018

(65) Prior Publication Data
US 2019/0018840 A1    Jan. 17, 2019

Related U.S. Application Data

(63) Continuation of application No. 15/480,758, filed on Apr. 6, 2017, now Pat. No. 10,120,862.

(51) Int. Cl.
| | | |
|---|---|---|
| *G06F 40/30* | (2020.01) |
| *G06F 8/30* | (2018.01) |
| *G06F 16/93* | (2019.01) |
| *G06F 16/33* | (2019.01) |
| *G06F 40/103* | (2020.01) |

(52) U.S. Cl.
CPC .............. *G06F 40/30* (2020.01); *G06F 8/315* (2013.01); *G06F 16/3344* (2019.01); *G06F 16/93* (2019.01); *G06F 40/103* (2020.01)

(58) Field of Classification Search
CPC .......................... G06F 17/2785; G06F 17/211
USPC .............................................................. 704/9
See application file for complete search history.

(56) References Cited

U.S. PATENT DOCUMENTS

| | | |
|---|---|---|
| 6,285,980 B1 | 9/2001 | Gandhi et al. |
| 7,146,381 B1 | 12/2006 | Allen et al. |
| 7,689,431 B1 | 3/2010 | Carmel et al. |
| 7,730,013 B2 | 6/2010 | Dill et al. |
| 8,332,408 B1 | 12/2012 | Rudary |
| 8,909,697 B2 | 12/2014 | Dillon et al. |
| 8,930,807 B2 | 1/2015 | Haubrich et al. |

(Continued)

OTHER PUBLICATIONS

Chrono, Retrieved from Internet: URL: https://github.com/wanasit/chrono, 5 pages.

(Continued)

*Primary Examiner* — Shaun Roberts
(74) *Attorney, Agent, or Firm* — Schmeiser, Olsen & Watts, LLP; Michael Petrocelli

(57) ABSTRACT

A method, computer system, and computer program product for accessing documents is provided. The method includes providing a document having one or more original time references having corresponding meanings depending on one or more time bases, identifying the original time references in the document, generating corresponding time artifacts for the original time references, the time artifacts including corresponding time values being calculated from the corresponding original time references according to the time bases and/or corresponding calculation instructions for calculating the corresponding time values from the corresponding original time references according to the time bases, and associating the corresponding time artifacts with the original time references for outputting the corresponding time values.

17 Claims, 6 Drawing Sheets

(56) References Cited

U.S. PATENT DOCUMENTS

| | | |
|---|---|---|
| 2002/0038213 A1 | 3/2002 | Ada |
| 2006/0009973 A1 | 1/2006 | Nguyen et al. |
| 2007/0174306 A1 | 7/2007 | Gibson et al. |
| 2007/0277102 A1 | 11/2007 | Kanzaki |
| 2008/0257587 A1 | 11/2008 | Bates et al. |
| 2010/0094615 A1 | 4/2010 | Roh et al. |
| 2013/0238316 A1 | 9/2013 | Shastri et al. |
| 2014/0146200 A1 | 5/2014 | Scott et al. |
| 2015/0112976 A1 | 4/2015 | Beebe |
| 2015/0193392 A1 | 7/2015 | Greenblatt et al. |
| 2015/0278199 A1 | 10/2015 | Hazen et al. |
| 2018/0144308 A1 | 5/2018 | Lips |

OTHER PUBLICATIONS

The Scrapinghub Blog, Parse Natural Language Dates With Dateparser, Retrieved from Internet on Oct. 4, 2016, URL: https://blog.scrapinghub.com/2015/11/09/parse-natural-language-dates-with-dateparser/, 4pages.

Webmonkey Staff, Add Semantic Value to Your Pages With HTML 5, Retrieved from Internet: URL: http://www.webmonkey.com/2010/02/add_semantic_value_to_your_pages_with_html_5/, PSTATZ 2.15.10, 8 pages.

w3schools.com, The World's Largest Web Developer Site, Retrieved from Internet on Oct. 4, 2016, HTML time Tag, http://www.w3schools.com/tags/tag_time.asp, 6 pages.

Moment.js/Home, 2.15.1, Retrieved from Internet on Oct. 4, 2016, http://momentjs.com/, 3 pages.

Datejs, A JavaScript Date Library, Last Updated Apr. 18, 2015, The official DateJS project has now been moved to GitHub:https://github.com/datejs, Second Last Update Apr. 14, 2008, Retrieved from Internet on Oct. 4, 2016, https://code.google.com/archive/p/datejs/, 8 pages.

Office Action (dated Feb. 20, 2018) for U.S. Appl. No. 15/480,758, filed Apr. 6, 2017.

Amendment (dated May 21, 2018) for U.S. Appl. No. 15/480,758, filed Apr. 6, 2017.

Notice of Allowance (dated Jun. 25, 2018) for U.S. Appl. No. 15/480,358, filed Apr. 6, 2017.

DYNAMIC MANAGEMENT OF RELATIVE TIME REFERENCES IN DOCUMENTS

This application is a continuation application claiming priority to Ser. No. 15/480,758, filed Apr. 6, 2017.

TECHNICAL FIELD

The present invention relates to the information technology field. More specifically, this present relates to the access to documents.

BACKGROUND

Documents are commonly used to convey information. Particularly, documents in digital form may be accessed for this purpose in computing systems; a typical example is the Internet, which allows users to access a huge number of digital documents in a global system of interconnected computing machines worldwide.

SUMMARY

A method, computer system, and computer program product for accessing document is provided. A processor of a computing system provides a document comprising one or more original time references having corresponding meanings depending on one or more time bases. At least one original time reference is identified in the document. A corresponding time artifact is generated for the at least one original time reference, the corresponding time artifact comprising corresponding time values being calculated from the corresponding original time references according to the one or more time bases and/or corresponding calculation instructions for calculating the corresponding time values from the corresponding original time references according to the one or more time bases. The corresponding time artifacts are associated with the at least one original time reference for outputting the corresponding time values.

DETAILED DESCRIPTION

Figure 1A:
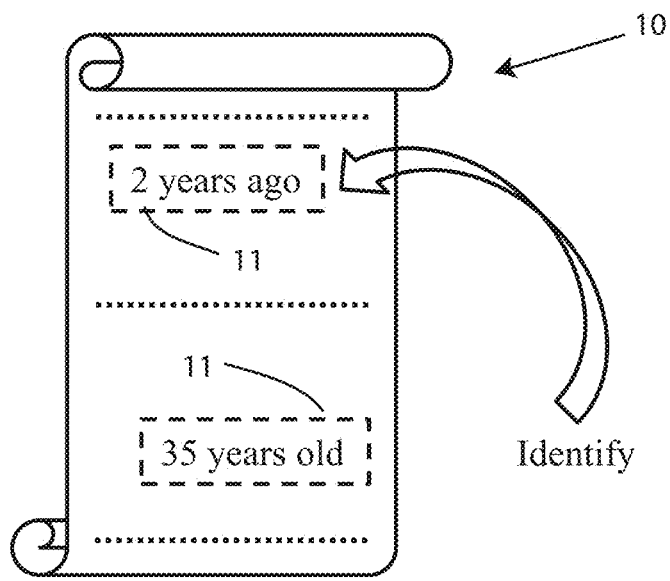
FIG. 1A depicts an embodiment of a digital document, in accordance with embodiments of the present invention.

Time references in documents may be relative when the time references' meanings depend on one or more time bases that are not indicated explicitly by the time references' values in the relative time references; for example, a time reference "2 years ago" refers to a creation date of the documents and a time reference "35 years old" indicates an age at that time. Therefore, the meanings of these time references and then of the whole documents may be easily misunderstood. For example, the time reference "2 years ago" may be referred by mistake to a current date; therefore, in a document that was created on Jan. 1, 2010 but that is accessed on Mar. 15, 2016, the time reference "2 years ago" may be understood as Mar. 15, 2014, instead of Jan. 1, 2008. Moreover, the time reference "35 years old" may be understood by mistake always as is; therefore, in the same situation as above there is not realized that the actual age has instead increased to more than 41 years from Jan. 1, 2010 to Mar. 15, 2016. In any case, the correct understanding of the documents may be quite difficult, if not impossible, for example, when the creation dates of the documents are not displayed explicitly in the documents' content.

Several techniques may be used to manage generic time references in different contexts.

For example, most programming languages have functions that return the current date, such as "date.today( )" in javascript. However, the use of these functions requires a specific knowledge of the corresponding programming languages.

Some markup languages have tags that may be used to identify portions of text as dates, such as "<time>" in HTML. However, these tags may only be used to encode dates statically; moreover, use of the tags requires the specific knowledge of the corresponding markup languages.

A technique has been proposed for using timeliness tags in HTML to associate contents to dates; particularly, an expiration date may be used to hide a corresponding content after the expiration date has lapsed. However, the use of theses tags requires the specific knowledge of HTML; moreover, in this case, any document is parsed to recognize the timeliness tags every time the timeliness is requested.

A technique has been proposed for managing pre-fetching of web pages in satellite communication systems, wherein the web pages contain advertisement images that are requested (e.g. by corresponding Javascripts) creating unique URLs based on the current date and time, so that a client does not find any content stored in the client's cache for that URL and always loads fresh advertisement images. However, different date/time values may be returned when each Javascript is executed on the client and on a corresponding proxy because the date/time values may be not perfectly synchronized or the date/time values may not be in the same time zone; in this case, any pre-fetched data obtained by the proxy is not matched to the URL requested by the client. Therefore, the Javascript is modified to execute a custom function instead of the original function, which returns predictable results so that the URLs generated by the client and the proxy will be the same. Particularly, the modified function rounds the time and makes the date/time identical even when the client and the proxy are located in different time zones, for example, by changing the time zones of the client and proxy, taking into account a corresponding time zone offset or using a common time zone.

FIG. 1A depicts an embodiment of a digital document 10, in accordance with embodiments of the present invention. As shown in FIG. 1A, a document 10 (i.e., everything that may be preserved or represented for some purpose) is provided in digital form in a computing system (e.g., by publishing the document in the Internet). The document 10 contains text with one or more original time references 11; the original time references 11 are relative, because the meanings of the time references 11 depend on one or more time bases that are not indicated explicitly by the time references' values therein. For example, an original time reference "2 year ago" depends on a creation date of the document and an original time reference "35 years old" depends on the creation date of the document and on a current date at which the document is accessed. The original time references 11 are identified in the document (e.g., by performing a semantic analysis of its text written in natural language).

Figure 1B:
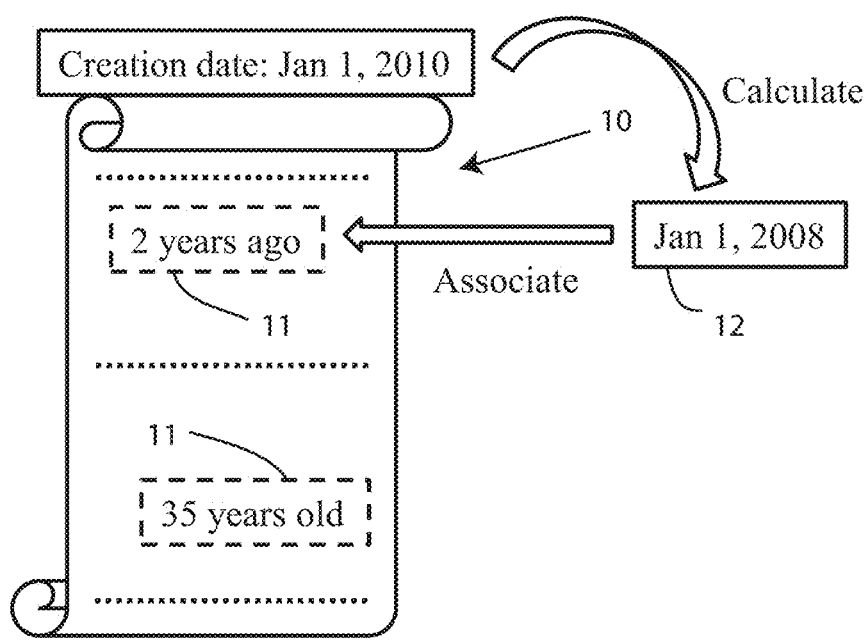
FIG. 1B depicts the digital document of FIG. 1A, wherein corresponding time artifacts are generated for original time references, in accordance with embodiments of the present invention.

FIG. 1B depicts the digital document 10 of FIG. 1A, wherein corresponding time artifacts 12 are generated for original time references 11, in accordance with embodiments of the present invention. Particularly, the time artifacts 12 may comprise corresponding time values that are calculated from the original time references 11 according to the time bases, which may happen when the original time references 11 depend on time bases that are fixed, such as the creation date of the document. In this case, the creation date is determined by retrieving the creation date from metadata of the document and the time values are calculated accordingly. Therefore, if the creation date is Jan. 1, 2010, the original time reference "2 years ago" provides the time value "Jan. 1, 2008". The time artifacts 12 are then associated with the corresponding original time references 11 by replacing the original time references 11 in the document 10 or by storing the association between the time artifacts 12 and the original time references 11 in a dedicated mapping structure.

Figure 1C:
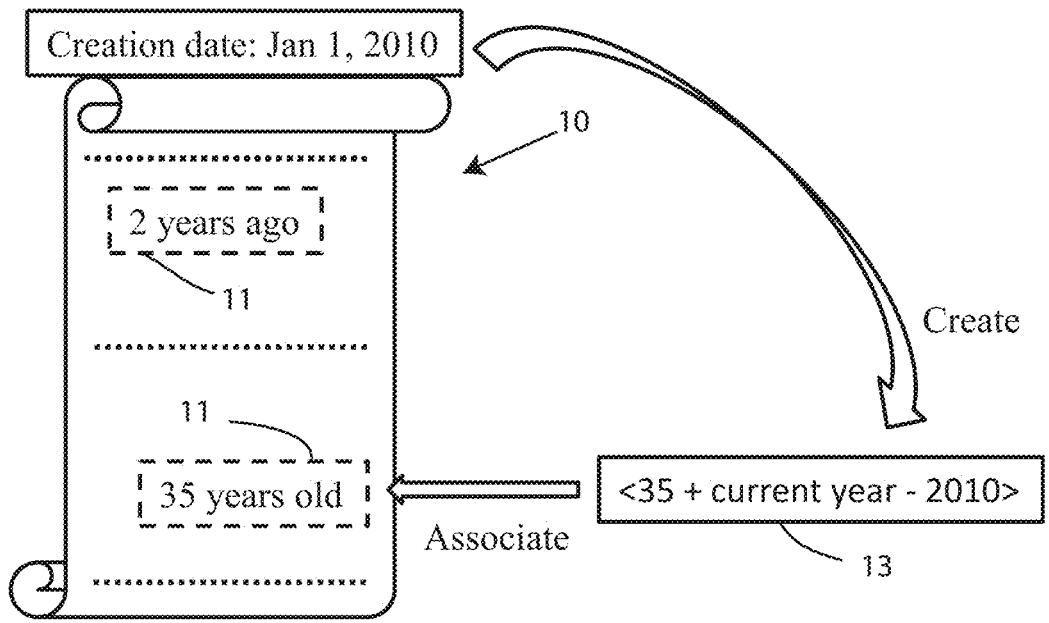
FIG. 1C depicts the digital document of FIG. 1A, wherein time artifacts comprise calculation instructions, in accordance with embodiments of the present invention.

FIG. 1C depicts the digital document 10 of FIG. 1A, wherein time artifacts 12 comprise calculation instructions 13, in accordance with embodiments of the present invention. The calculation instructions 13 may be for calculating corresponding time values from the corresponding original time references 11 according to the time bases, which may happen when the original time references 11 depend on time bases that are variable over time, such as the current date at which the document is accessed. In this case, any other fixed time bases on which the original time references 11 depend are retrieved, such as the creation date of the document as above, and the calculation instructions 13 are created accordingly; therefore, again with the creation date of Jan. 1, 2010, the original time reference "35 years old" generates the calculation instruction "<35+current year−2010>". The time artifacts 12 are then associated with the corresponding original time references as above.

Figure 1D:
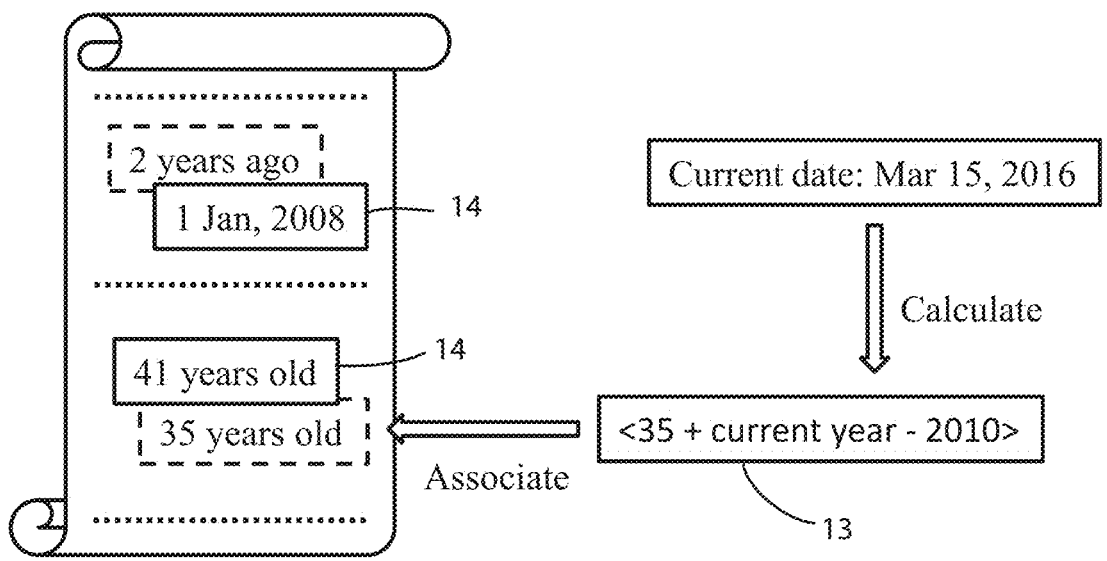
FIG. 1D depicts the digital document of FIG. 1A, wherein associations of the time artifacts with the original time references are used for outputting the corresponding time values, in accordance with embodiments of the present invention.

FIG. 1D depicts the digital document 10 of FIG. 1A, wherein associations of the time artifacts 12 with the original time references 11 are used for outputting the corresponding time values 14, in accordance with embodiments of the present invention. For example, any variable time bases are determined, such as the current date at which the document is accessed, and the corresponding time values 14 are calculated by applying the corresponding calculation instructions 13 to the current date; therefore, if the current date is Mar. 15, 2016, the calculation instruction "<35+ current year−2010>" provides the time value "41". At this point, a translated document may be generated from the original document and output in place thereof; for example, the original time references 11 are replaced with corresponding translated time references, each comprising the corresponding time value 14 and a possible text corresponding to the meaning of the original time reference 11 (e.g. "Jan. 1, 2008" and "41 years old" for "2 years ago" and "35 years old", respectively). Alternatively, the original document is output and the corresponding current time reference of each original time reference 11 is output (e.g. in a popup window) in response to a request thereof.

The above-described solution translates the relative time references of any documents dynamically. In this way, the time references may always be interpreted or construed correctly, independently of the time at which the documents are accessed, which may apply both to time references that depend on fixed time bases (e.g. the creation date of the documents) and to time references that depend on variable time bases (e.g. the current date). As a result, any risk of misunderstanding the meaning of the time references and then of the whole documents is substantially avoided, which may apply to event dates (e.g. "2 years ago" with respect to the creation date) and to bibliographic data (e.g. "35 years old" at the creation date).

Embodiments of the present invention may have general applicability because embodiments of the present invention may not require any specific instrumentation of the documents. Therefore, embodiments of the present invention may be applied to any type of documents, either new ones or existing ones.

Figure 2:
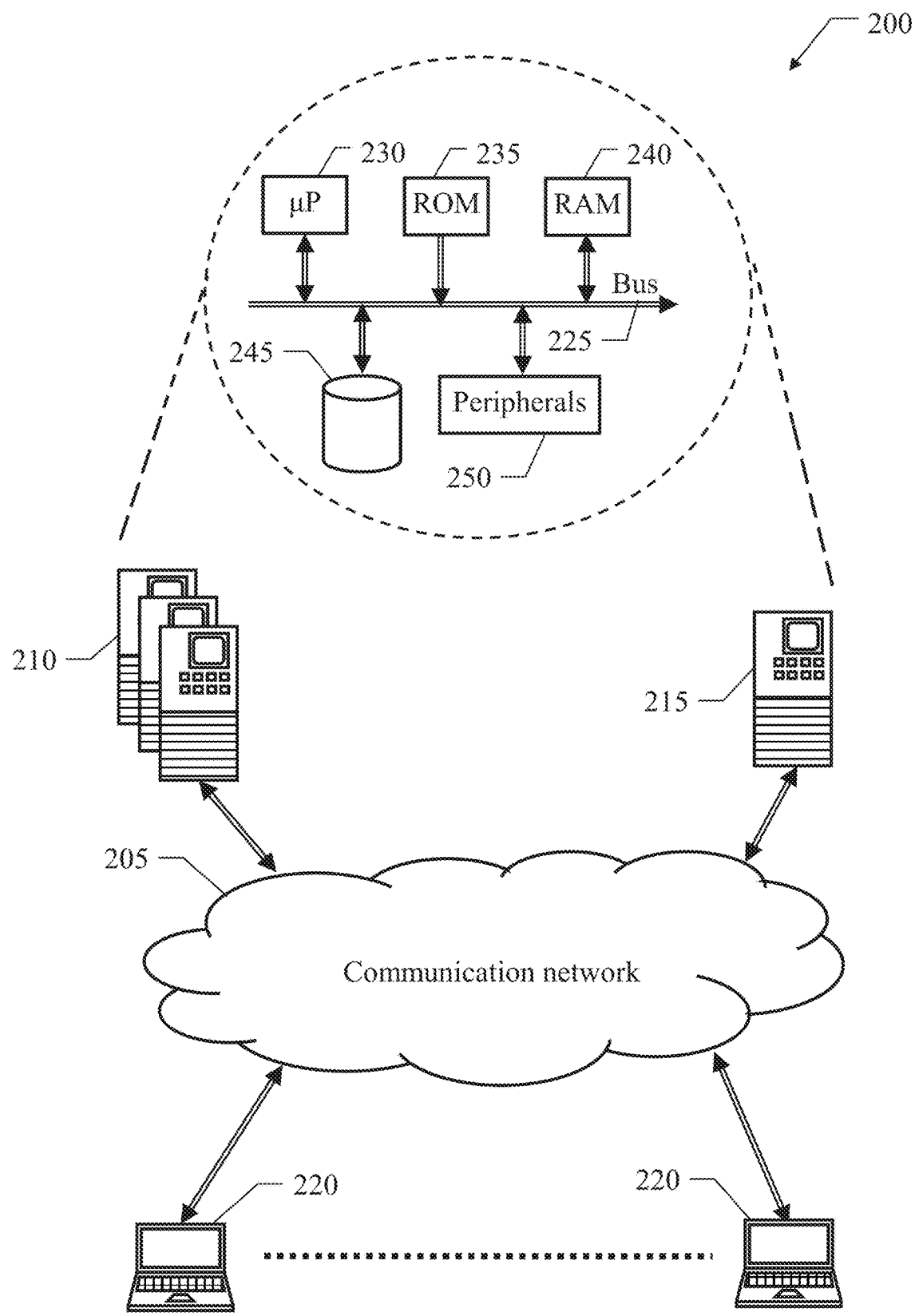
FIG. 2 is a schematic block diagram of a computing system 200, in accordance with embodiments of the present invention.

FIG. 2 is a schematic block diagram of a computing system 200, in accordance with embodiments of the present invention. The computing system 200 has a distributed architecture based on a communication network 205 (e.g. the Internet).

Several server computing machines, servers, and the like are connected to the communication network 205 for providing a number of services, implemented by corresponding nodes of one or more cloud providers. Particularly, as far as relevant to the present disclosure, one or more of the servers, referred to as content servers 210, implement corresponding Content Management Systems (CSMs) for managing digital contents (i.e., any information content media that may be processed by computing machines)—for the sake of simplicity, in the following reference is made only to digital documents. Another one or more of the servers, referred to as analysis server 215, implements a service for performing a semantic analysis of the documents. One or more client computing machines 220, such as clients and the like, are used to connect to the communication network 205 by users thereof, particularly, as far as relevant to the present disclosure, the clients 220 are used to access the documents provided by the content servers 210 online.

Each computing machine of the computing system 200 (i.e., the content servers 210, the analysis server 215 and the clients 220) comprises several units that are connected among them with a bus architecture 225 having one or more levels with an architecture that is suitably scaled according to the function of the computing machine 210, 220. Particularly, one or more microprocessors (μP) 230 control operation of the computing machine 210, 220; a non-volatile memory (ROM) 235 stores basic code for a bootstrap of the computing machine 210, 220 and a volatile memory (RAM) 240 is used as a working memory by the microprocessors 230. The computing machine 210, 220 is provided with a mass-memory 245 for storing programs and data; for example, the mass-memory 245 of the content and analysis servers 210, 215 may comprise storage devices of a data center wherein the servers 210, 215 are implemented, whereas the mass-memory 245 of the clients 220 may comprise solid-state disks. Moreover, the computing machine 210, 220 comprises a number of peripheral, or Input/Output (I/O), units 250; for example, the peripheral units 250 of the servers 210, 215 may comprise a network adapter for plugging the peripheral unit into the data center and a drive for reading/writing removable storage units (like DVDs) implemented by a console of the data center, whereas the peripheral units 250 of the clients 220 may comprise a monitor, a keyboard, a mouse, a similar drive for reading/writing removable storage units and a wireless network adapter for connecting to the communication network 205.

Figure 3:
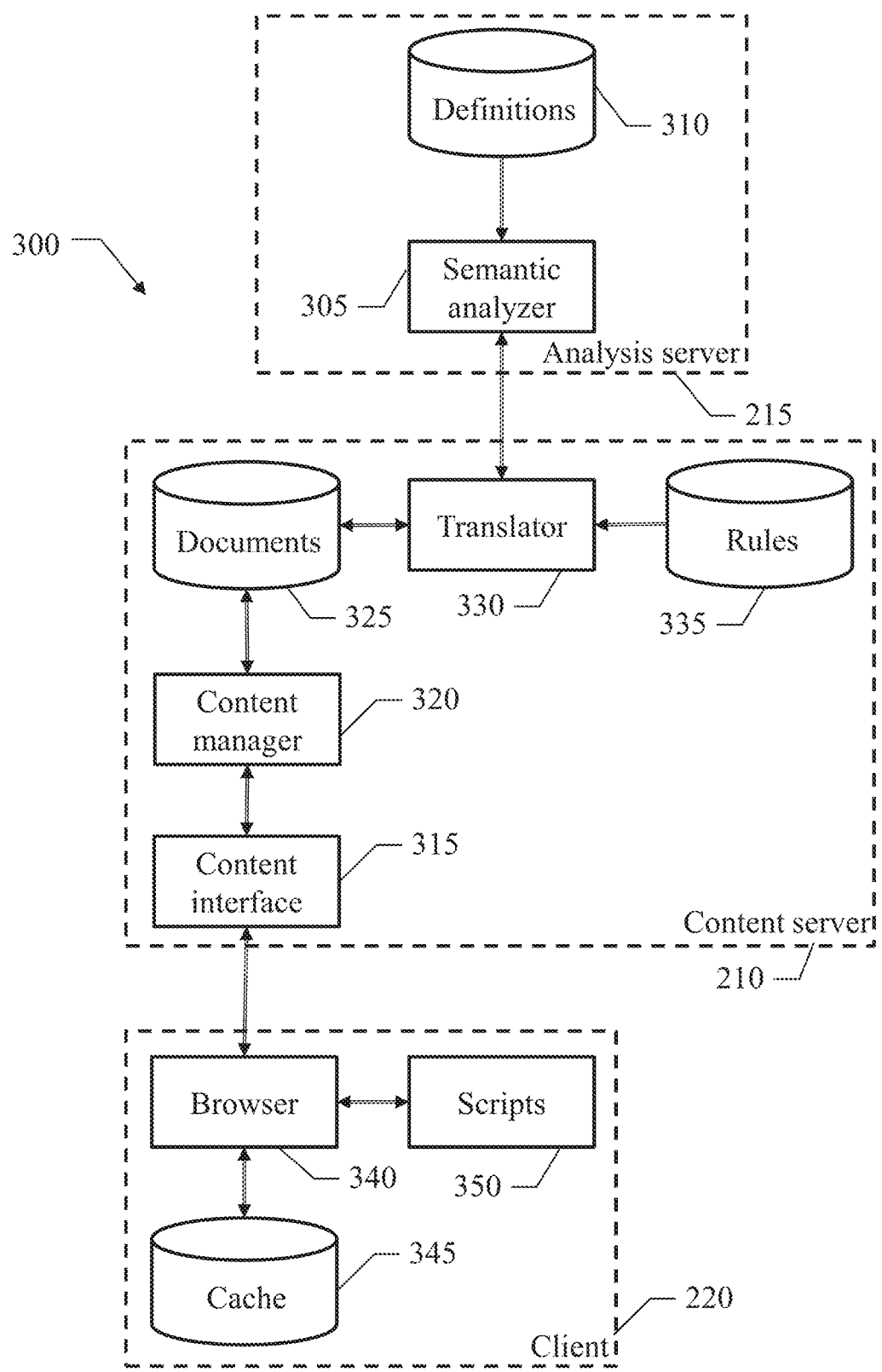
FIG. 3 depicts a schematic view of software components, in accordance with embodiments of the present invention.

FIG. 3 depicts a schematic view of software components, in accordance with embodiments of the present invention.

All the software components (e.g. programs and data) are denoted as a whole with the reference 300. The software components are typically stored in the mass memory and loaded at least partially into the working memory of the corresponding computing machines when the programs are running, together with an operating system and other application programs not shown in the figure. The programs are initially installed into the mass memory, for example, from corresponding removable storage units or from the communication network. In this respect, each program may be a module, segment or portion of code, which comprises one or more executable instructions for implementing the specified logical function.

Embodiments of the analysis server 215 may comprise the following components. A semantic analyzer 305 implements a semantic analysis service (e.g. "Watson Explorer" by "IBM Corporation", trademarks thereof). The semantic analyzer 305 accesses in read mode a definition repository 310. The definition repository 310 stores time reference definitions of relative time references in natural language; for example, fixed time references depending on the creation dates of the documents may be defined by expressions like:

"<number> day(s)/week(s)/months(s)/years(s) ago",
"today", "yesterday", "tomorrow",
"last/next week/month/year", and variable time references depending on the current dates at which the documents are accessed may be defined by expressions like:

<number> day(s)/week(s)/months(s)/years(s) old",
"lasting <number> day(s)/week(s)/months(s)/years(s)".

Embodiments of the content server 210 may comprise the following components. A content interface 315 implements a front-end of the content interface's CSM; particularly, as far as relevant to the present disclosure, the content interface 315 is used for accessing the documents of interest by possibly authorized users of the clients 220. The content interface 315 interacts with a content manager 320. The content manager 320 implements a back-end of the CSM. The content manager 320 accesses in read/write mode a content repository 325. The content repository 325 stores all the documents that are available in the CSM; each document comprises a body with the document's content, comprising text written in natural language and a header with corresponding metadata comprising the creation date of the document. In an exemplary embodiment, a translator 330 is used to translate the relative time references of the documents; the translator 330 accesses in read/write mode the document repository 325 and interacts with the semantic analyzer 305 of the analysis server 215. Moreover, the translator 330 accesses in read mode a rule repository 335. The rule repository 335 stores translation rules for generating the time artifacts from the original time references; for example, the translation rules for:

"<number> day(s)/week(s)/months(s)/years(s) ago" is "on <number + current day/week/month/year − creation day/week/month/year>",
"today" is "on <creation date>",
"yesterday" is "on <creation date − 1 day>",
"tomorrow" is "on <creation date + 1 day>",
"last/next week/month/year" is "on/in <creation date −/+ 1 week/month/year>",
"<number> day(s)/week(s)/months(s)/years(s) old" is "<number + current day/week/month/year − creation day/week/month/year> day(s)/week(s)/months(s)/years(s) old", and
"lasting <number> day(s)/week(s)/months(s)/years(s)" is "lasting <number + current day/week/month/year − creation day/week/month/year> day(s)/week(s)/months(s)/years(s)".

Embodiments of the client 220 may include a browser 340. A web browser 340 is used to surf the Internet; as far as relevant to the present disclosure, the browser 340 allows the user of the client 220 to access the content interface 315 of each content server 210 for accessing any documents of interest. The browser 340 exploits a cache memory 345 for storing contents that have been downloaded from the Internet temporarily, comprising the documents accessed in the content servers 210. Moreover, the browser 340 is capable of interpreting instructions of scripts 350 (e.g. written in the JavaScript language).

Figure 4A:
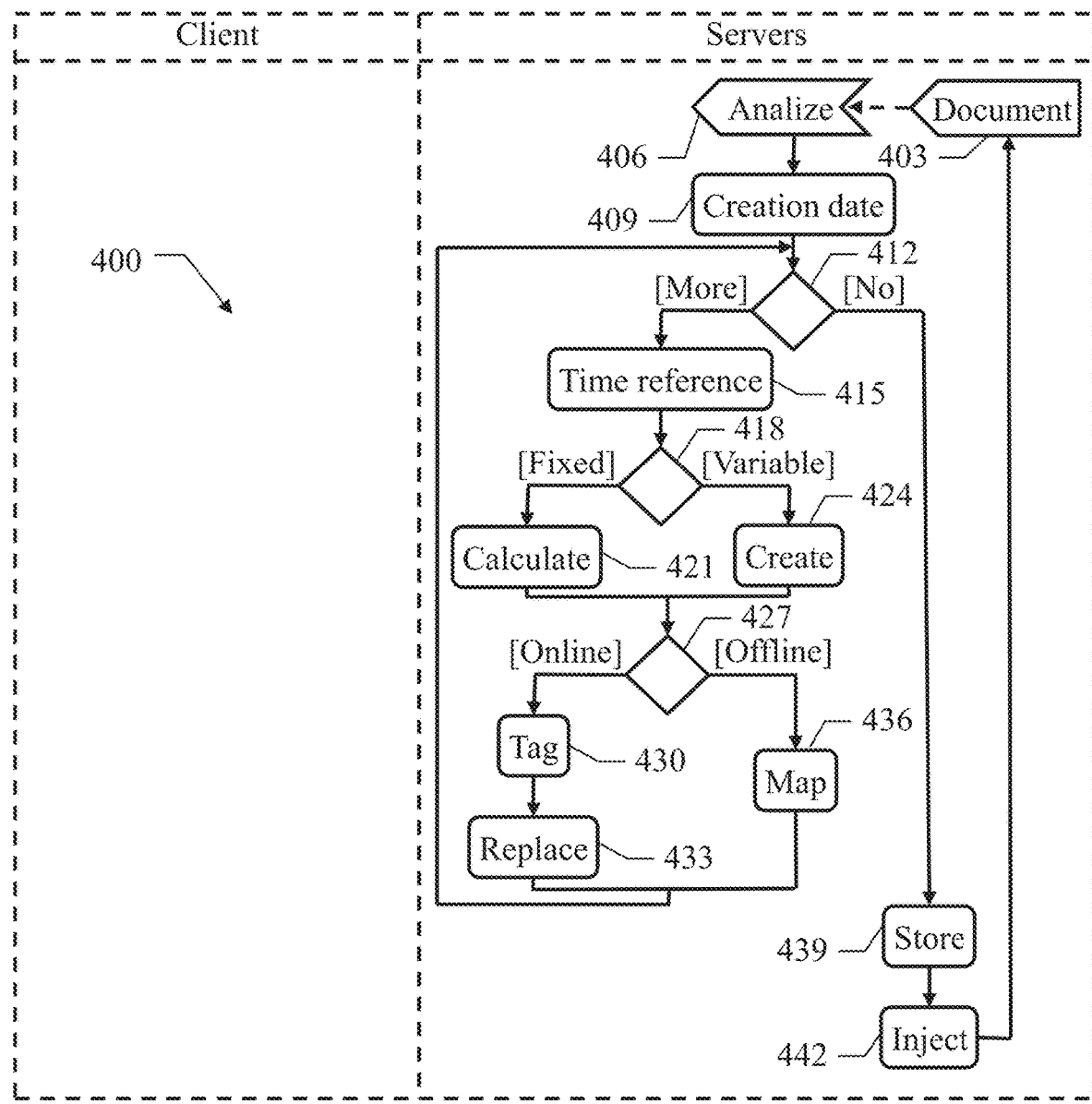
FIG. 4A depicts a first activity diagram describing a flow of activities relating to an implementation of the present invention, in accordance with embodiments of the present invention.
Figure 4B:
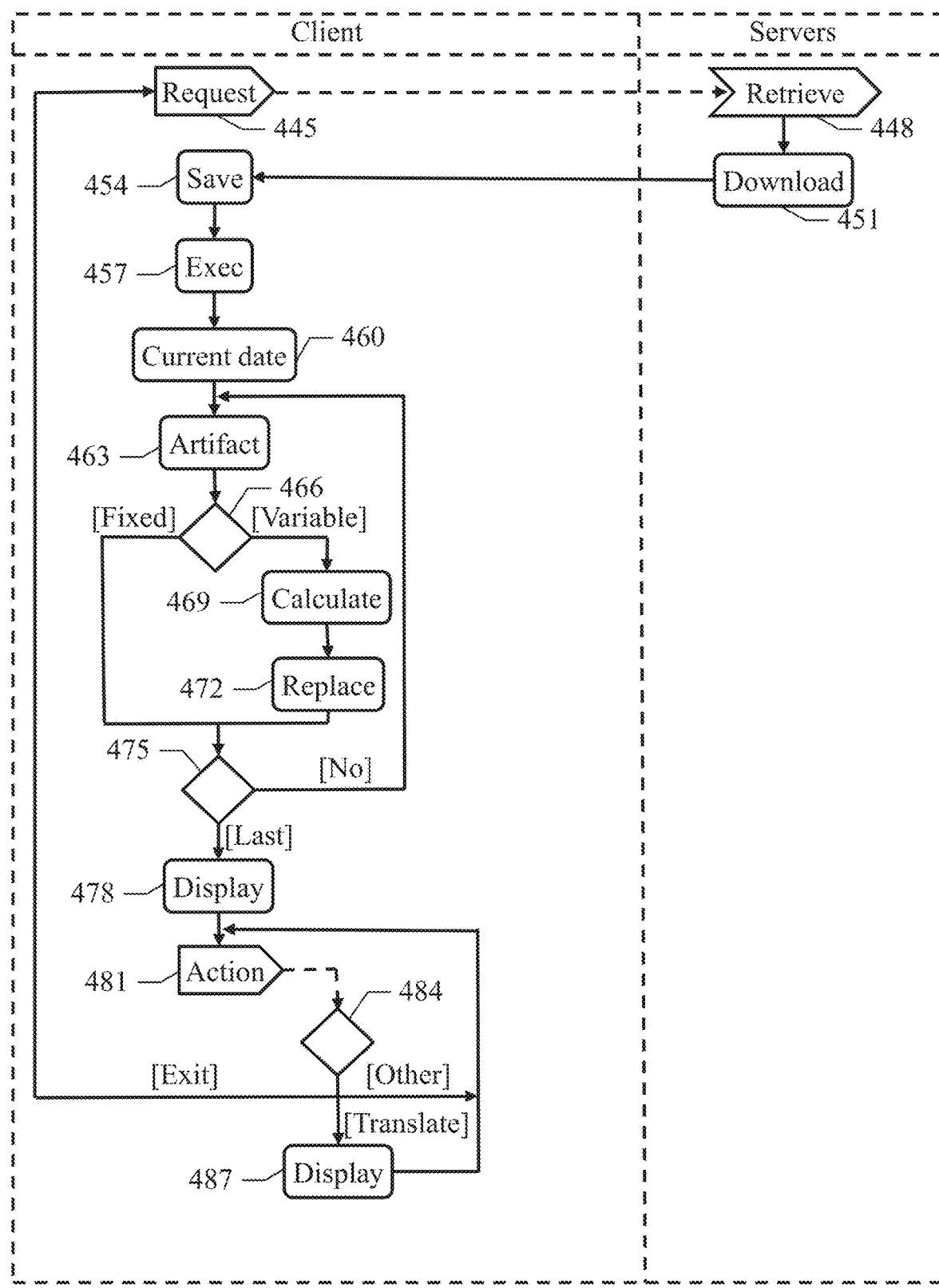
FIG. 4B depicts a second activity diagram describing a flow of activities relating to an implementation of the present invention, in accordance with embodiments of the present invention.

FIG. 4A depicts a first activity diagram describing a flow of activities relating to an implementation of the present invention, in accordance with embodiments of the present invention. FIG. 4B depicts a second activity diagram describing a flow of activities relating to an implementation of the present invention, in accordance with embodiments of the present invention.

Particularly, the diagram represents an exemplary process that may be used to access documents with a method 400. In this respect, each block may correspond to one or more executable instructions for implementing the specified logical function on the computing system.

Starting from the swim-lane of the content/analysis servers, at block 403 in the content server, the translator detects any new document that is submitted to or any existing document that is updated in the document repository (e.g. by continually monitoring the document); the translator then submits a request of semantic analysis of the document to the analysis server. In response thereto, at block 406 in the analysis server, the semantic analyzer determines any relative time references of the document as matching the time reference definitions stored in the corresponding repository. The semantic analyzer then returns a result of the semantic analysis of the document to the translator, which may comprise an identification of any original time references in the document (e.g. defined by the time reference's text or position within the document) and an indication of a type of time reference (i.e., fixed or variable).

Returning to the content server at block 409, the translator retrieves the creation date of the document from the document's metadata. A loop is now entered for generating the time artifacts for the original time references of the document, if any. The loop begins at block 412, wherein the translator verifies whether any original time references are still to be processed. If so, at block 415, the translator takes a present original time reference to be processed into account in any arbitrary order. The flow of activity branches at block 418 according to the type of the original time reference. Particularly, if the original time reference is fixed (i.e., the time reference depends only on fixed time bases, such as the creation date of the document), at block 421, the translator generates the corresponding time artifact according to the translation rules retrieved from the corresponding repository so as to comprise the corresponding translated time reference; for this purpose, the translator calculates the corresponding time value and adds the text corresponding to the meaning of the current time reference, if necessary. For example, if the creation date is Jan. 1, 2010, the original time references "1 month ago", "tomorrow" and "last year" provide the time artifacts (i.e., translated time references) "Dec. 1, 2009", "Jan. 2, 2010" and "in 2009", respectively. Referring back to block 418, if the original time reference is instead variable (i.e., the time references depends on at least one variable time base, such as the current date, either alone or in combination with any fixed time bases), at block 424, the translator creates the corresponding time artifact according to the translation rules retrieved from the corresponding repository so as to comprise the corresponding calculation instruction, for this purpose, the translator creates the corresponding calculation instruction and adds the text corresponding to the meaning of the current time reference, if necessary. For example, if the creation date is again Jan. 1, 2010, the original time references "10 months old" and "lasting 2 years" provide the time artifacts "<10+current month-December 2009> months old" and "lasting <2+current year–2010> years", respectively.

The flow of activity then descends into block 427 from either the block 421 or the block 424. At this point, the flow of activity branches according to a type of translation that will be applied to the document. Particularly, if the document is translated automatically as the document is accessed, at block 430, the translator tags the original time reference in the body of the document to identify the original time reference (e.g. by enclosing the original time reference in the HTML tag "<time>") and the original time reference's type (e.g. by adding a corresponding attribute "type=fixed/variable" to this tag). Continuing to block 433, the translator replaces the original time reference in the body of the document with the original time reference's time artifact. Referring back to the block 427, if the document is instead translated on request for each original time reference thereof, at block 436, the translator maps the original time reference to the time artifact of the original time reference. For this purpose, the translator adds a new record to a dedicated mapping structure that may be initially empty; the record identifies the original time reference (e.g. by the original time reference's text or position in the document) and the original time reference's type fixed/variable (e.g. as above), and the translator indicates the corresponding time artifact.

In both cases, the process then returns to the block 412 from either the block 433 or the block 436 to verify again whether any original time references are still to be processed. As soon as no original time reference remains to be processed, always true when the document contains no relative time reference, the above-described loop is exited by descending into block 439. At this point, the translator stores a result of the above-mentioned association of the original time references with the corresponding time artifacts into the document repository. Particularly, in case of automatic translation the translator saves the document with the document's original time references replaced by the corresponding time artifacts in place of the document's original version; conversely, in case of on-request translation the translator adds the mapping structure to the document (e.g. into the document's header), without affecting the document's body. Continuing to block 442, the translator injects a translation script into the header of the document for controlling the document's display; the translation script is configured according to the type of translation (e.g. automatic/on-request) of the document (e.g. by setting a corresponding attribute in the header. Therefore, the document is processed for generating the document's time artifacts only once for each version thereof, independently of any access thereto by the clients; moreover, the processing is performed completely on the servers. Therefore, this operation, which may be relatively complex, does not adversely affect the performance of the clients. The process then returns to the block 403 waiting for a next submission of any new document or updating of any existing document.

In a completely independent way, at block 445 in the swim-lane of a generic client, the browser receives an access request for a selected document entered by the user of the client (e.g. by clicking on a corresponding hyperlink in a web page); the browser then submits a request for the document to the content server. Moving to the swim-lane of the servers, in response thereto at block 448 in the content server, the content manager retrieves the document from the corresponding repository. Continuing to block 451, the content interface returns the document to the client for downloading thereto. With reference again to the swim-lane of the client, at block 454, the browser receives the document and saves the document into the client's cache memory.

Continuing to block 457, the loading of the web page of the document causes the browser to launch its translation script, if any. The translation script retrieves the current date at block 460 (e.g. by invoking a corresponding API of the operating system). A loop is now entered for processing the time artifacts of the document. The loop begins at block 463, wherein the translation script takes a present time artifact into account in any arbitrary order. Particularly, if the translation script is configured for translating the document automatically according to the corresponding flag in the header of the document, the time artifacts are found by looking for the time artifacts' tags in the body of the document; conversely, if the translation script is configured for translating the document on request, the time artifacts are found by looking for them in the mapping structure in the header of the document. The flow of activity branches at block 466 according to the type of the time artifact. Particularly, if the time artifact is variable as indicated by the corresponding attribute, at block 469, the translation script calculates the corresponding time value by applying calculation instructions to the current date. Continuing to block 472, the translation script generates the corresponding current time reference by replacing the calculation instruction with the time reference's time value and then replaces the time artifact in the body of the document or in the mapping structure of the document's header) with the corresponding current time reference; for example, if the current date is Mar. 15, 2016, the time artifacts "<10+current month–December 2009> months old" and "lasting <2+current year–2010> years" provide the current time references "64 months old" and "lasting 8 years", respectively. The process then descends into block 475; the same point is also reached directly from the block 466 if the time artifact is fixed and then already comprises a current time reference. In both cases, the translation script verifies whether a last time artifact of the document has been processed. If not, the flow of activity returns to the block 463 to process a next time artifact.

Conversely, as soon as all the time artifacts of the document have been processed, the above-described loop is exited by descending into block 478. At this point, the browser displays the document into a window on the monitor of the client. Therefore, in case of automatic translation, the browser directly displays the translated version of the document, with the document's current time references already replaced by the corresponding current time references, which is completely opaque to the user, which may then interpret the document correctly without performing any action. Conversely, in case of on-request translation or in case the document does not contain any relative time reference and then no translation script, the browser displays the document in an original version of the document.

The browser now enters a waiting condition at block 481 for any action by the user of the client. As soon as the user performs an action on the browser, the process descends into block 484; at this point, the flow of activity branches according to the type of action that has been performed by the user. Particularly, if the user has entered a command for exiting the web page of the document (e.g. by clicking on a hyperlink to another web page or by returning to a previous web page), the process goes back to the block 445 to repeat the same operations as soon as the browser receives another access request for a further document. Referring back to the block 484, the process descends into block 487 if the user, in case of on-request translation of the document, has entered a translation request of a selected original time reference (e.g. by double-clicking on it). At this point, the translation script retrieves the corresponding translated time reference from the mapping structure in the header of the document, the translation script then displays the translated time reference, for example, in a popup window close to the original time reference. Therefore, the document may be interpreted correctly without updating the document's original content. In this way, the current time references are always contextualized on the corresponding original time references; moreover, this allows interpreting the document correctly even when the document may not be updated (e.g. because of copyright restrictions). The process then returns to the block 481 waiting for a next action by the user. Referring back to the block 484, as far as relevant to the present disclosure, in all the other cases the process directly returns to the block 481 comprising in case of automatic translation of the document.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details, such as the numerical values, set forth in the preceding description to provide a more thorough understanding thereof, conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, each numerical value should be read as modified by the term about unless already done and each range of numerical values should be intended as expressly specifying any possible number along the continuum within the range comprising the range's end points. Moreover, ordinal or other qualifiers are merely used as labels to distinguish elements with the same name but do not by themselves connote any priority, precedence or order. The terms include, comprise, have, contain and involve and any forms thereof should be intended with an open, non-exhaustive meaning (i.e., not limited to the recited items), the terms based on, dependent on, according to, function of and any forms thereof should be intended as a non-exclusive relationship (i.e., with possible further variables involved), the term a/an should be intended as one or more items unless expressly indicated otherwise, and the term means for or any means-plus-function formulation should be intended as any structure adapted or configured for carrying out the relevant function.

For example, an embodiment provides a method for accessing documents in a computing system. However, the documents may be of any type (e.g. web pages, text files, word-processor files, files in page description formats such as PDF, written in any language such as a natural one, a structured one) and the documents may be accessed in any computing system (see below).

In an embodiment, the method comprises providing a document. However, the document may be provided in any way (e.g. by copying, uploading, downloading the document either locally or remotely).

In an embodiment, the document comprises one or more original time references that have corresponding meanings depending on one or more time bases. However, the original time references may be in any number and of any type (e.g. dates, times, temporal expressions) and the original time references' meanings may depend on any number and type of time bases (e.g. fixed ones, variable ones or any combination thereof).

In an embodiment, the method comprises identifying the original time references in the document. However, the original time references may be identified in any way (e.g. by semantic analysis or string matching of natural languages, by parsing of structured languages).

In an embodiment, the method comprises generating corresponding time artifacts for the original time references. However, the time artifacts may be generated in any way (e.g. automatically or on request, either remotely or locally); moreover, the time artifacts may be in any number and of any type (e.g. time values, calculation instructions or any combination thereof, either alone or with the text corresponding to the meanings of the corresponding original time references).

In an embodiment, the time artifacts comprise corresponding time values that are calculated from the corresponding original time references according to the time bases. However, the time values may be of any type (e.g. hours, days, months, years) and the time values may be calculated according to any number and types of time bases (e.g. fixed ones at any time and/or variable ones at runtime).

In an embodiment, in addition or in alternative the time artifacts comprise corresponding calculation instructions for calculating the corresponding time values from the corresponding original time references according to the time bases. However, the calculation instructions may be of any type (e.g. expressions, commands, etc.) and the calculation instructions may be created according to any number and types of time bases (e.g. variable ones and/or fixed ones at any time).

In an embodiment, the method comprises associating the corresponding time artifacts with the original time references. However, this association between the corresponding time artifacts and the original time references may be performed in any way (e.g. remotely or locally) and the association may be of any type (e.g. by replacement, mapping or any combination thereof).

In an embodiment, the association is for outputting the corresponding time values. However, the time values may be output in any way (e.g. automatically, on request or any combination thereof, with the translation type that may be selected individually for each document or globally at the level of the server or of the client); moreover, the time values may be output by any means (e.g. by displaying, printing, etc.).

In an embodiment, the step of identifying the original time references comprises identifying the original time references by a semantic analysis of a text of the document written in natural language. However, the semantic analysis may be performed in any way (e.g. locally or by a remote service) on the document written in any natural language (e.g. national languages, dialects, controlled languages, constructed languages, etc.).

In an embodiment, the method comprises generating the time artifacts to comprise corresponding translated time references. However, the translated time references may be generated in any way (e.g. directly from the original time references, from the time artifacts after calculating the time values from the calculation instructions or any combination thereof).

In an embodiment, each translated time reference comprises the corresponding time value and a possible text corresponding to the meaning of the corresponding original time reference. However, the text may be of any type (e.g. a word, an expression, etc.) or the text may be missing.

In an embodiment, the method comprises generating a translated document from the document by replacing the original time references with the corresponding translated time references. However, the translated document may be generated in any way (e.g. partially or completely in real-time, or even in batch mode when all the translated time references are known in advance).

In an embodiment, the method comprises outputting the translated document in place of the document. However, the translated document may be output in any way (e.g. with the possibility of displaying the current time reference corresponding to each translated time reference on request).

In an embodiment, the method comprises outputting the document. However, the document may be output in any way (e.g. with an indication of the possibility of translating the document's original time references on request).

In an embodiment, the method comprises outputting the corresponding translated time references of one or more of the original time references in response to a translation request thereof. However, the translated time references may be output in any way (e.g. in corresponding popup windows, tooltips) in response to any translation request (e.g. either individually for each original time reference, such as by selection in a menu or by hovering with a pointer, or all together for the whole document).

In an embodiment, the step of generating corresponding time artifacts comprises for one or more fixed original time references of the original time references depending on one or more fixed time bases of the time bases, determining the fixed time bases. However, the fixed time bases may be in any number and of any time (e.g. the creation date of the document, the publication date of the document, the date of a specific event) and the fixed time bases may be determined in any way (e.g. either from metadata of the document or from any other information source, such as online services).

In an embodiment, the same step comprises calculating the corresponding time values from the fixed original time references according to the fixed time bases. However, each time value may be calculated in any way (e.g. by setting the time value to a single time base, adding/subtracting any amount of time to/from the time base, according to any combination of two or more time bases, such as at the middle of them).

In an embodiment, the step of determining the fixed time bases comprises retrieving a creation date of the document from metadata thereof. However, the creation date may be retrieved from any metadata (e.g. in the header of the document, in a separate database).

In an embodiment for one or more variable original time references of the original time references depending on one or more variable time bases of the time bases, the method comprises determining the variable time bases. However, the variable time bases may be in any number and of any time (e.g. the current date, a variable date of a recurring event, such as Easter) and the variable time bases may be determined in any way (e.g. either locally or remotely).

In an exemplary embodiment, the method comprises calculating the corresponding time values by applying the corresponding calculation instructions to the variable time bases. However, the time values may be calculated in any way (e.g. by interpreting expressions, executing commands, according to the variable time bases only or further according to one or more fixed time bases).

In an exemplary embodiment, the step of determining the variable time bases comprises retrieving a current date. However, the current date may be retrieved in any way (e.g. from a system clock or an online service).

In an exemplary embodiment, the method comprises storing an association result of the associating the corresponding time artifacts with the original time references. However, the association result may be stored in any way (e.g. within the document or separately from the document); in any case, the possibility is not excluded of translating the current time references every time the document is accessed.

In an exemplary embodiment, the method comprises retrieving the document and the association result in response to an access request to the document. However, the document and the association result may be retrieved in any way (e.g. together or in succession) in response to any access request (e.g. generically for the document or specifically for the translation of the document's original time references).

In an exemplary embodiment, the step of storing an association result comprises replacing the original time references with the corresponding time artifacts in the document. However, the original time references may be replaced in any way, either cancelling or preserving the original time references).

In an exemplary embodiment, the step of storing an association result comprises storing the association result in a mapping structure distinct from a content of the document. However, the mapping structure may be of any type (e.g. in the header of the document, in corresponding cookies, etc.).

In an exemplary embodiment, the method comprises injecting program code into the document. However, the program code may be of any type (e.g. scripts, executable programs) or the program code may be omitted (e.g. when the browser is already instrumented for performing the same operations).

In an exemplary embodiment, the program code is for calculating the corresponding time values by applying the calculation instructions.

In an exemplary embodiment, the program code is for outputting the time values on request. In any case, this operation may also be omitted (e.g. when the translation of the document is automatic).

Generally, similar considerations apply if the same solution is implemented with an equivalent method by using similar steps with the same functions of more steps or portions thereof, removing some steps being non-essential, or adding further optional steps; moreover, the steps may be performed in a different order, concurrently or in an interleaved way, at least in part.

An embodiment provides a computer program configured for causing a computing system to perform the above-mentioned method when the computer program is executed on the computing system. An embodiment provides a computer program product, the computer program product comprising a computer readable storage medium having program instructions embodied therewith, the program instructions being executable by a computing system to cause the computing system to perform the same method. However, the computer program may be implemented as a stand-alone module, as a plug-in for a pre-existing computer program (e.g. the content management system and/or the browser), or even directly in the latter; moreover, the computer program may run on any computing system. In any case, embodiments of the present invention lend itself to be implemented even with a hardware structure (e.g. by electronic circuits integrated in one or more chips of semiconductor material), or with a combination of software and hardware suitably programmed or otherwise configured.

An embodiment provides a system comprising means configured for performing each of the steps of the above-mentioned method. An embodiment provides a system comprising a circuitry (i.e., any hardware suitably configured, for example, by software) configured for performing each of the steps of the same method. However, the system may be of any type (e.g. any physical and/or virtual computing machine, either stand-alone or communicating with other computing machines via any local, wide area, global, cellular or satellite network and exploiting any type of wired and/or wireless connections); particularly, the above-described operations may be performed all on one or more servers, on each client or on any combination thereof.

Generally, similar considerations apply if the system has a different structure or comprises equivalent components or the system has other operative characteristics. In any case, every component thereof may be separated into more elements, or two or more components may be combined together into a single element; moreover, each component may be replicated to support the execution of the corresponding operations in parallel. Moreover, unless specified otherwise, any interactivity between different components generally does not need to be continuous, and it may be either direct or indirect through one or more intermediaries.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one embodiment, the system of the present invention may be or include a hardware device such as a computer, portable device, etc. In one embodiment, the hardware device is or includes a special-purpose device (e.g., computer, machine, portable device) that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

A computer program product of the present invention may include one or more computer readable hardware storage devices having computer readable program code stored therein, said program code containing instructions executable by one or more processors of a computing system (or computer system) to implement the methods of the present invention.

A computer system of the present invention may include one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for accessing documents, the method comprising:

identifying by a processor, at least one original time reference in a document;

generating, by the processor, a corresponding time artifice for the at least one original time reference;

associating, by the processor, the corresponding time artifacts with the at least one original time reference for outputting corresponding time values;

generating, by the processor, the corresponding time artifacts to comprise corresponding translated time references, each translated time reference comprising the corresponding time values and a text corresponding to the meaning of the corresponding at least one original time reference, which changes the meaning of the at least one original time reference to a user accessing the document, independently of a time at which the document is accessed;

generating, by the processor, a translated document from the document by replacing the at least one original time reference with the corresponding translated time references; and outputting, by the processor, the translated document in place of the document.

2. The method according to claim 1, wherein the at least one original time reference is identified by a semantic analysis of a text of the document written in natural language.

3. The method according to claim 1, wherein the corresponding time artifact comprising corresponding time values being calculated from the corresponding original time references according to the one or more time bases and/or corresponding calculation instructions for calculating the corresponding time values from the corresponding original time references according to the one or more time bases.

4. The method according to claim 1, further comprising:
outputting, by the processor, the document; and
outputting, by the processor, the corresponding translated time references of one or more of the at least one original time references in response to a translation request thereof.

5. The method according to claim 1, wherein the generating corresponding time artifacts comprises, for one or more fixed original time references of the original time references depending on one or more fixed time bases of the time bases:
determining, by the processor, the fixed time bases; and
calculating, by the processor, the corresponding time values from the fixed original time references according to the fixed time bases.

6. The method according to claim 5, wherein the determining the fixed time bases comprises:
retrieving, by the processor, a creation date of the document from metadata thereof.

7. The method according to claim 1, wherein for one or more variable original time references of the at least one original time reference depending on one or more variable time bases of the time bases, the method comprises:
determining, by the processor, the variable time bases; and
calculating, by the processor, the corresponding time values by applying the corresponding calculation instructions to the variable time bases.

8. The method according to claim 1, wherein the determining the variable time bases comprises:
retrieving, by the processor, a current date.

9. The method according to claim 1, further comprising:
storing, by the processor, an association result of the associating the corresponding time artifacts with the at least one original time reference; and
retrieving, by the processor, the document and the association result in response to an access request to the document.

10. The method according to claim 9, wherein the storing an association result comprises:
replacing, by the processor, the at least one original time reference with the corresponding time artifacts in the document.

11. The method according to claim 9, wherein the storing an association result comprises:
storing, by the processor, the association result in a mapping structure distinct from a content of the document.

12. The method according to claim 1, further comprising:
injecting, by the processor, program code for calculating the corresponding time values by applying the calculation instructions into the document.

13. The method according to claim 1, further comprising:
injecting, by the processor, program code for outputting the time values on request into the document.

14. A computer program product, comprising a computer readable hardware storage device storing a computer readable program code, the computer readable program code comprising an algorithm that when executed by a computer processor of a computing system implements a method for accessing documents, the method comprising:
identifying by the processor, at least one original time reference in a document;
generating, by the processor, a corresponding time artifact for the at least one original time reference;
generating, by the processor, the corresponding time artifacts to comprise corresponding translated time references, each translated time reference comprising corresponding time values and a possible text corresponding to the meaning of the corresponding at least one original time reference, which changes the meaning of the at least one original time reference to a user accessing the document, independently of a time at which the document is accessed;
generating, by the processor, a translated document from the document by replacing the at least one original time reference with the corresponding translated time references; and
outputting, by the processor, the translated document in place of the document.

15. The computer program product of claim 14, wherein the corresponding time artifact comprising corresponding time values being calculated from the corresponding original time references according to the one or more time bases and/or corresponding calculation instructions for calculating the corresponding time values from the corresponding original time references according to the one or more time bases.

16. A computer system comprising:
a processor;
a memory device coupled to the processor; and
a computer readable storage device coupled to the processor, wherein the storage device contains program code executable by the processor via the memory device to implement a method of accessing documents, the method comprising:
identifying, by the processor, at least one original time reference in a document;
generating, by the processor, a corresponding time artifact for the at least one original time reference;
associating, by the processor, the corresponding time artifacts with the at least one original time reference for outputting corresponding time values;
generating, by the processor, the corresponding time artifacts to comprise corresponding translated time references, each translated time reference comprising the corresponding time values and a possible text corresponding to the meaning of the corresponding at least one original time reference, which changes the meaning of the at least one original time reference to a user accessing the document, independently of a time at which the document is accessed;
generating, by the processor, a translated document from the document by replacing the at least one original time reference with the corresponding translated time references; and
outputting, by the processor, the translated document in place of the document.

17. The computer system according to claim 16, wherein the corresponding time artifact comprising corresponding time values being calculated from the corresponding original time references according to the one or more time bases and/or corresponding calculation instructions for calculating the corresponding time values from the corresponding original time references according to the one or more time bases.

* * * * *